US012447456B2

(12) United States Patent
Kostylev et al.

(10) Patent No.: US 12,447,456 B2
(45) Date of Patent: Oct. 21, 2025

(54) BIOLOGICAL SAMPLE CAPTURE WITH MULTIPLEX ANALYSIS

(71) Applicant: ProteoWise Inc., New Haven, CT (US)

(72) Inventors: Mikhail Kostylev, New Haven, CT (US); Erik Gunther, Branford, CT (US)

(73) Assignee: PROTEOWISE INC., New Haven, CT (US)

(*) Notice: Subject to any disclaimer, the term of this patent is extended or adjusted under 35 U.S.C. 154(b) by 542 days.

(21) Appl. No.: 17/732,932

(22) Filed: Apr. 29, 2022

(65) Prior Publication Data

US 2022/0370976 A1    Nov. 24, 2022

Related U.S. Application Data

(60) Provisional application No. 63/182,345, filed on Apr. 30, 2021.

(51) Int. Cl.
B01J 19/00 (2006.01)
G01N 33/543 (2006.01)

(52) U.S. Cl.
CPC .... B01J 19/0046 (2013.01); G01N 33/54306 (2013.01); B01J 2219/00587 (2013.01); B01J 2219/00626 (2013.01)

(58) Field of Classification Search
None
See application file for complete search history.

(56) References Cited

U.S. PATENT DOCUMENTS

| 5,187,083 A | 2/1993 | Mullis |
| 2010/0261159 A1* | 10/2010 | Hess .................... B01J 19/0046 435/7.1 |
| 2014/0349867 A1 | 11/2014 | Handique |

FOREIGN PATENT DOCUMENTS

| GB | 2346370 A | 8/2000 |
| WO | WO 2002/016383 A1 | 2/2002 |
| WO | WO 2019/191613 A1 | 10/2019 |

(Continued)

OTHER PUBLICATIONS

Lisdat, F. et al. "Protein Multilayer Architectures on Electrodes for Analyte Detection", 2013, Biosensors Based on Aptamers and Enzymes (253-258). (Year: 2013).*

(Continued)

*Primary Examiner* — Heather Calamita
*Assistant Examiner* — Elizabeth Rose Lafave
(74) *Attorney, Agent, or Firm* — Bryan D. Zerhusen; Nicholas R. Herrel; CANTOR COLBURN LLP

(57) ABSTRACT

Methods of transferring bio-molecular components of individual cells in a biological sample to a solid porous substate, as well as methods of examining or detecting one or more bio-molecular components of individual cells in a biological sample. The method transferring including contacting the biological sample to a first side of the porous solid substrate having a plurality of interstices or pores extending contiguously from the first side to a second side, transferring and affixing the bio-molecular components of the biological sample to the interstices or pores of the solid substrate, and the method of examining or detecting includes detecting one or more of the bio-molecular components of the biological sample transferred to the solid porous substrate.

21 Claims, 3 Drawing Sheets

(56) References Cited

FOREIGN PATENT DOCUMENTS

| WO | WO 2019/217396 | 11/2019 |
| WO | WO 2021/030427 | 2/2021 |

OTHER PUBLICATIONS

Audet, J. and Brown, R. "Current techniques for single-cell lysis", 2008, J R Soc Interface (S131-134). (Year: 2008).*
Nsabimana, A. et al. "Aptasensors Based on Stripping Voltammetry", 2016, Chemosensors (1-3). (Year: 2016).*
Tang, C. et al. "Dissecting the Role of Substrate on the Morphology and Separation Properties of Thin Film Composite Polyamide Membranes: Seeing is Believing", 2020, Environmental Science & Technology (6978-6980). (Year: 2020).*
Wu, W. et al. "Chemical Probes for Visualizing Intact Animal and Human Brain Tissue", 2017, Cell Chemical Biology (660-668). (Year: 2017).*
Yang, W. et al. "Recent advances in electrochemiluminescence-based simultaneous detection of multiple targets", 2020, TrAC Trends in Analytical Chemistry (2-6). (Year: 2020).*
Zhu, Y. et al. "Porous ceramics: Light in weight but heavy in energy and environment technologies", Jan. 2021, Materials Science and Engineering: R: Reports (1-25). (Year: 2021).*
International Search Report and Written Opinion dated Aug. 26, 2022 for PCT/US2022/026923.

* cited by examiner

BIOLOGICAL SAMPLE CAPTURE WITH MULTIPLEX ANALYSIS

CROSS-REFERENCE TO RELATED APPLICATIONS

The present disclosure claims the benefit of and the priority to U.S. Provisional Patent Application No. 63/182,345, filed 30 Apr. 2021 and titled BIOLOGICAL SAMPLE CAPTURE WITH MULTIPLEX ANALYSIS, which incorporated by reference herein in its entirety.

INCORPORATION BY REFERENCE

International Patent Application Publication No. WO 2019/217396, published 14 Nov. 2019, and International Patent Application Publication No. WO 2021/030427, published 18 Feb. 2021, are incorporated herein by reference in their entirety for all purposes. Furthermore, all references cited herein are incorporated by reference herein in their entirety for all purposes.

FIELD OF THE INVENTION

The description provides a high throughput process for examining and/or detecting bio-molecular components, such as proteins, nucleic acids, lipids, and carbohydrates, of individual cells or viruses.

BACKGROUND

The absence of a practical, cost effective, high-throughput technique to examine individual bio-molecular components in individual cells is a significant limitation to biotechnology and biomedical research. As such, there is an ongoing need in the art for efficient and practical methods of identifying and quantifying distinct bio-molecular components of individual cells. The present disclosure addressed these needs.

SUMMARY

The present disclosure provides compostions and methods that surprising and unexpectedly allow for the covalent capture and/or detection of the entire bio-molecular (e.g., protein, nucleic acid, lipid, metabolite or carbohydrate) repertoire of a single cell (e.g., eukaryotic or prokaryotic) or virus. Thus, an aspect of the present disclosure provides a method for transferring one or more bio-molecular components of a biological sample to a solid porous substate. The method comprises: (i) contacting or seeding a biological sample comprising a whole cell (e.g., a eukaryotic cell or a prokaryotic cell), or a virus to a first side of a porous solid substrate having a plurality of interstices or pores extending therethrough from the first side to a second side; (ii) transferring the bio-molecular components of the biological sample to the interstices or pores of the solid substrate; and (iii) affixing (e.g., via covalent binding) the bio-molecular components of the biological sample to the interstices or pores of the solid substrate.

In any aspect or embodiment described herein, the method further comprises a step of contacting or seeding of the biological sample on the porous solid substrate such that only a single cell or virus is disposed at the opening of each respective interstices or pore on the first side of the substrate.

In any aspect or embodiment described herein, transferring the bio-molecular components of the biological sample includes lysing the biological sample (e.g., with the electrophoretic step or a step of applying a lysis buffer to the biological sample, cells and/or virus on the porous solid substrate) so that the bio-molecular components from the cell or the virus that are seeded on the porous solid substrate flow immediately into the interstices or pores.

In any aspect or embodiment described herein, transferring the bio-molecular components of the biological sample is accomplished through electrophoresis, convection, gravity, or centrifugation.

In any aspect or embodiment described herein, the biological sample, the whole cell, and/or the virus are lysed via electrophoresis.

In any aspect or embodiment described herein, the substrate is a derivatized porous alumina (e.g., a nanoporous alumina), porous glass, and/or polymeric material.

In any aspect or embodiment described herein, the interstices or pores have a diameter of about 500 nm or less.

In any aspect or embodiment described herein, the solid porous substrate has a thickness from the first side to the second side of about 50 nm to about 100 nm.

In any aspect or embodiment described herein, the porous solid substrate or the plurality of interstices or pores has a cellular component-reactive coating that is reactive to or has the intrinsic ability to covalently (i.e., irreversibly) bind and/or couple the bio-molecular components of biological sample, such as a cellular component-reactive coating that is reactive to or has intrinsic ability to covalently (i.e., irreversibly) bind and/or couple at least one of protein(s), nucleic acid(s), lipid(s), metabolite(s), carbohydrate(s), and combinations thereof.

In any aspect or embodiment described herein, the biological sample comprises, consists essentially of, or consists of a cell, e.g., eukaryotic or prokaryotic cell.

In any aspect or embodiment described herein, the biomolecular biological sample comprises, consists essentially of, or consists of a virus or viral particle.

In any aspect or embodiment described herein, the bio-molecular components of the biological sample include, consists essentially of, or consists of nucleic acids, proteins, lipids, metabolites, and/or carbohydrates.

In any aspect or embodiment described herein, the biological sample is a tissue section.

In any aspect or embodiment described herein, the method further comprises, prior to transferring the bio-molecular components of the biological sample, lysing the biological sample, the whole cell, and/or the virus on the solid porous substrate or prior to contact with the solid porous substrate. In any aspect or embodiment described herein, lysing the the biological sample, the whole cell and/or the virus on the porous solid substrate or prior to contact with the solid porous substrate includes applying a lysis buffer to the biological sample, the whole cells, and/or the virus, or contacting the biological sample, the whole cells and/or the virus with a lysis buffer.

Another aspect of the present disclosure provides a method for examining one or more bio-molecular components of individual cells or virus in a biological sample. The method comprises: transferring one or more bio-molecular components of individual cells or virus in a biological sample to a solid porous substate according to any aspect or embodiment described herein; and detecting one or more of the bio-molecular components of the biological sample.

In any aspect or embodiment described herein, detecting includes contacting the components of the biological sample with one or more probes specific for individual bio-molecular components of the individual cells.

In any aspect or embodiment described herein, the one or more probes are applied simultaneously.

In any aspect or embodiment described herein, the one or more probes are applied serially.

In any aspect or embodiment described herein, detecting further includes detecting binding of the one or more probes with the individual bio-molecular components of the biological sample.

In any aspect or embodiment described herein, detecting includes:
(a) contacting the bio-molecular components of the biological sample with one or more probes specific for individual bio-molecular components of the biological sample;
(b) detecting binding of the one or more probes to the individual bio-molecular components of the biological sample;
(c) stripping the one or more probes; and
(d) repeating (a) through (b) or (c) one or more times to detect additional bio-molecular components of the biological samples.

In any aspect or embodiment described herein, at least one probe includes or is conjugated to a detection marker (e.g., at least one probe includes or is conjugated to a fluorescent dye).

In any aspect or embodiment described herein, detecting further includes, after contacting the bio-molecular components of the biological sample with one or more probes specific for individual bio-molecular components of the biological sample, contacting the solid porous substrate or the bound probes with a probe specific binging moiety (e.g., an antibody, aptomer, etc.) that binds to a specific probe and that is conjugated to or includes a detection marker (e.g., a fluorescent dye).

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional aspects and embodiments are expressly included within the scope of the present disclosure. The publications and other materials used herein to illuminate the background of the disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which.

DETAILED DESCRIPTION

Figure 1:
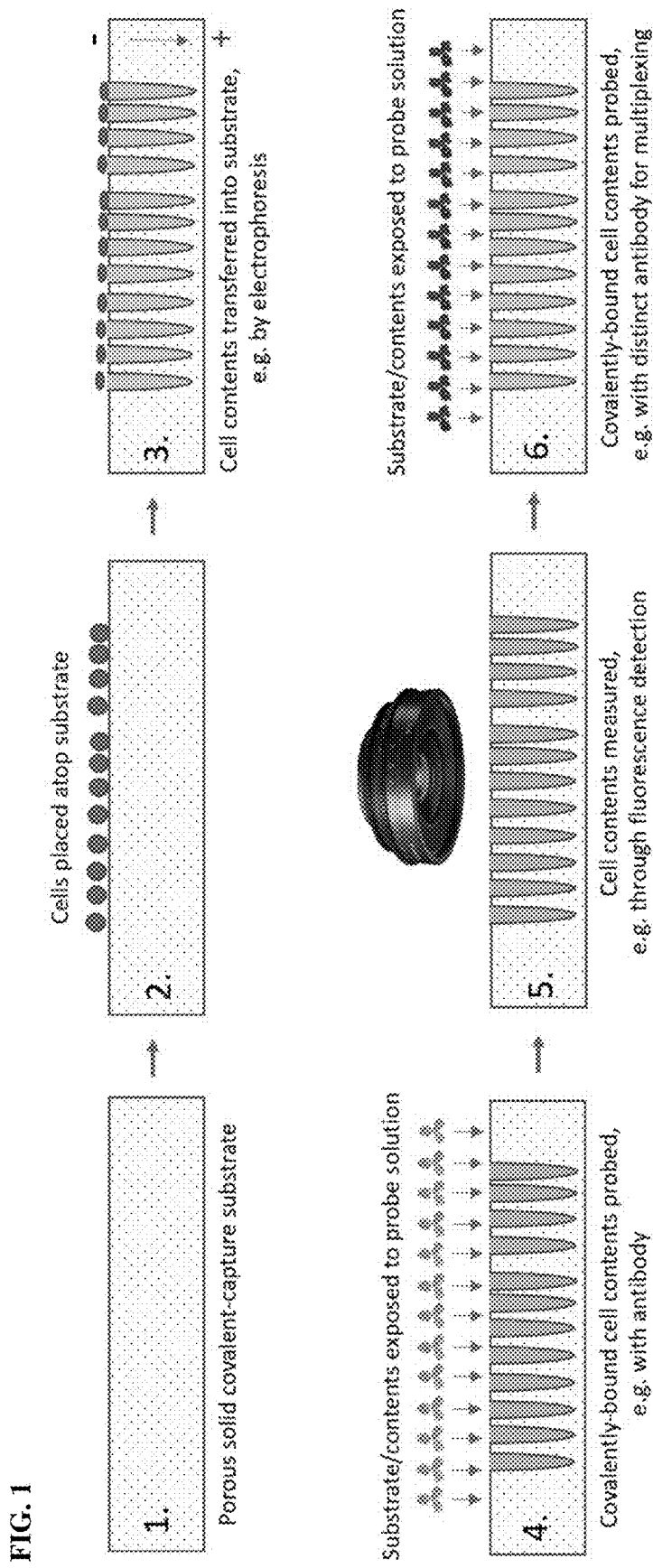
FIG. 1. Multiplexed single-cell data acquisition. (1) Cross-sectional illustration of an exemplary planar porous substrate used to capture and measure cellular analyte(s) of interest. (2) Prior to analyte capture, cells are placed on one side of the planar substrate, positioning the cells for subsequent release of their composition and covalent capture within the porous substrate. (3) The contents of the individual cells are induced to pass in a particular area through the pores of the substrate, by any motive force, such as electrophoresis, where they engage in covalent binding with the pore surfaces within the porous substrate. (4) The contents of every cell, each affixed to the substrate in a discrete location on the plane of the substrate, are exposed to a probe (e.g., an antibody) that specifically recognizes bio-molecular components of interest within the cells. (5) Orthogonal to the plane of the substrate, probe bound to its cognate molecule is measured, e.g. by optical detection of probe with fluorescent reagents, indicating the relative amount of cognate molecule of interest within the contents of each individual cell. (6) The substrate/content complex may optionally be probed multiple times, reiterating steps (4) and (5) with distinct probes that recognize distinct analytes, to extract measurement of multiple bio-molecular components of each cell transferred to the substrate.
Figure 2A:
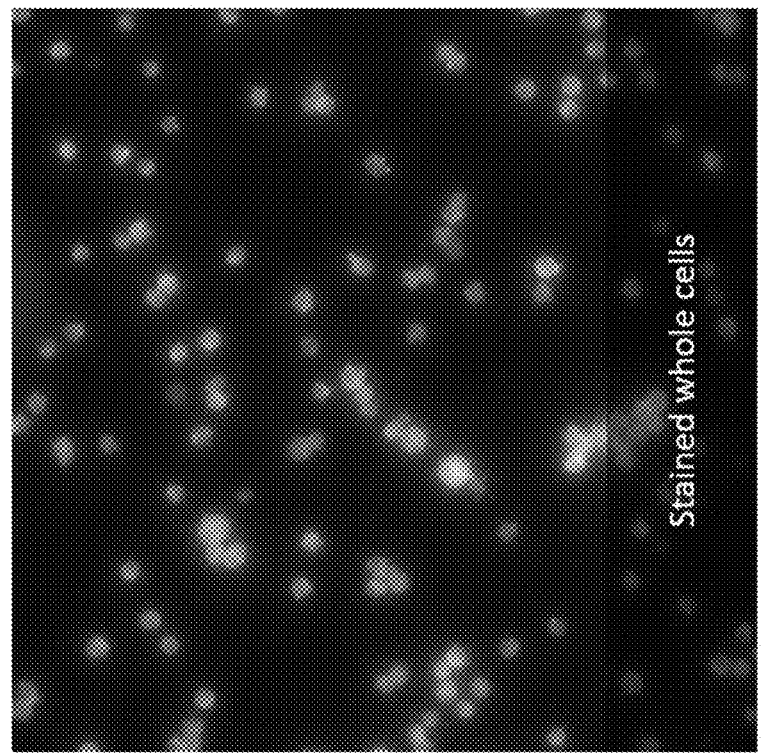
FIGS. 2A and 2B. (A) Cells exhibit immunoreactivity for the intracellular actin protein. Stained whole cells were immunoprobed with an antibody against actin by standard immunocytochemical procedure of cell fixation and immunoprobing (A). Cells plated atop porous alumina derivatized to covalently capture proteins (3-dimensional protein capture, or 3D-NPC) were subjected to an electric field to transfer cellular bio-molecular components to the 3D-NPC where the bio-molecular components were covalently captured, followed by immunoprobing for actin (B). Comparable immunostaining between the two methods demonstrates effectiveness of whole-cell immunocytochemistry using 3D-NPC substrate.
Figure 2B:
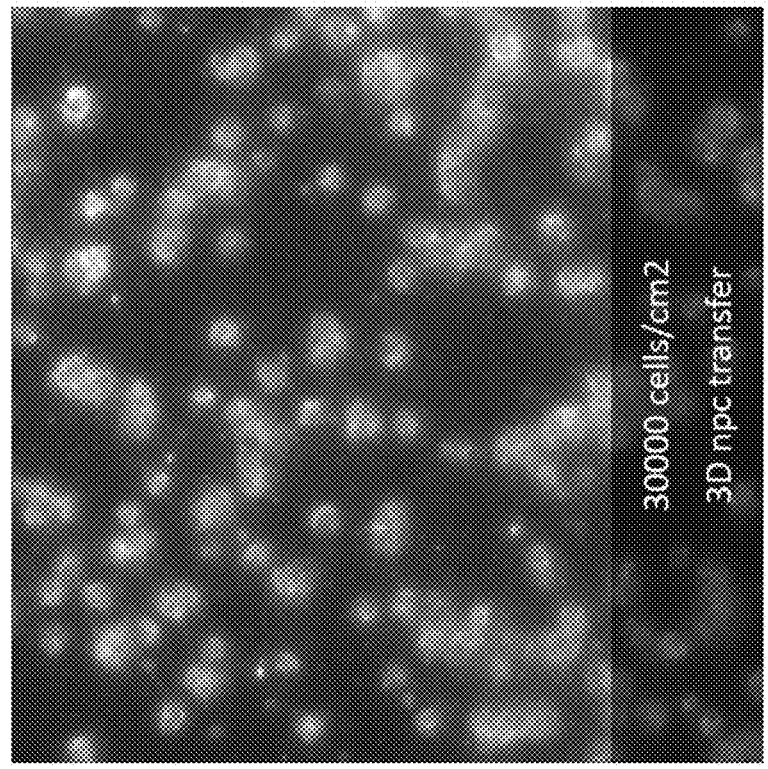
Figure 3:
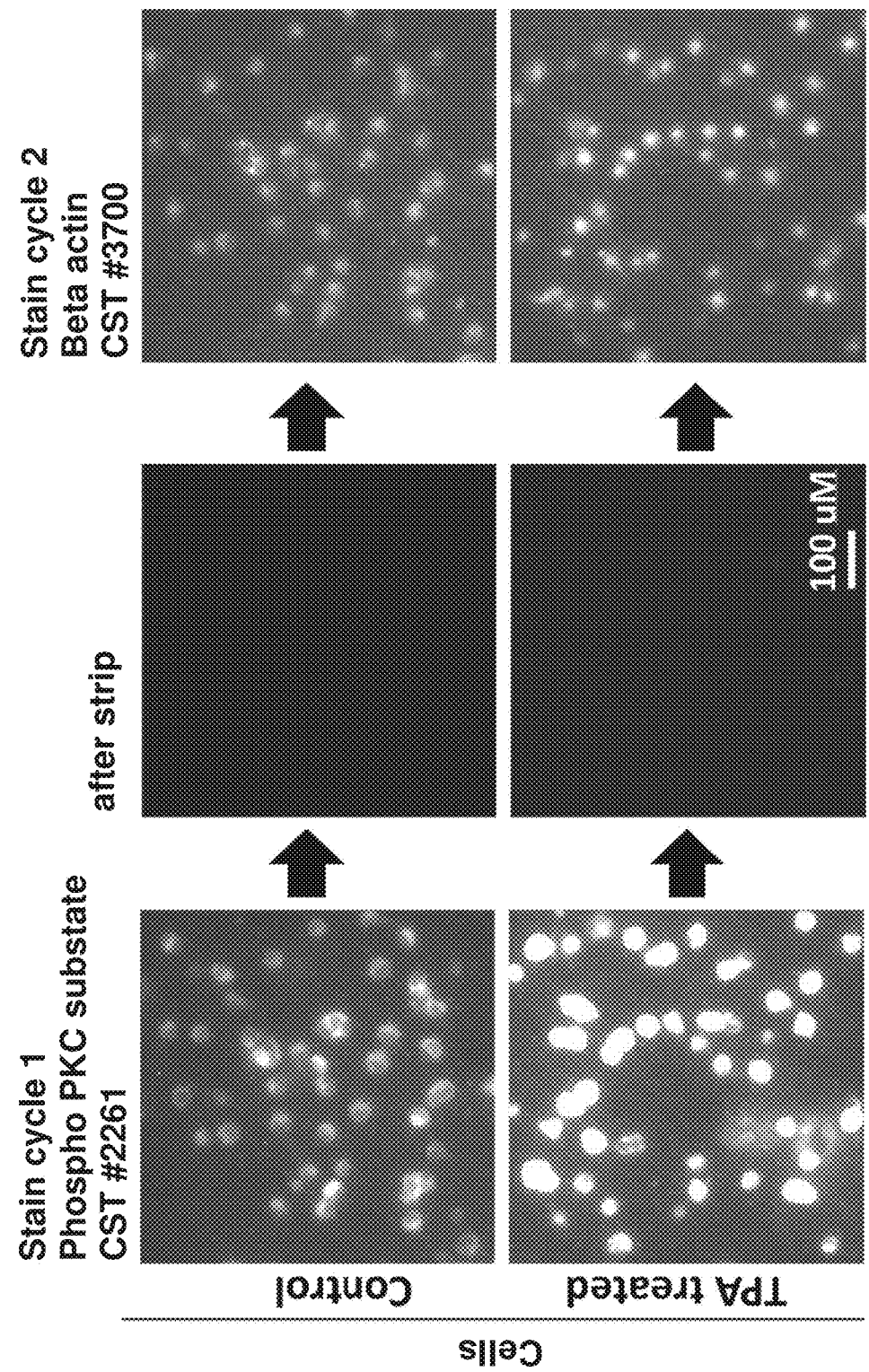
FIG. 3. Complex mixtures of the bio-molecular components of individual cells that have been transferred to 3D-NPC and captured covalently within the pores/interstices of 3D-NPC enable resolution of immunochemical differences between and within individual cells. The captured bio-molecular components can be stripped of detection chemistry, followed by re-probing to extract additional information from individual cells. Treatment of EXPI293™ cells (mammalian 293 cells with the EXPI293™ Expression System) with the protein kinase C (PKC) activator 12-O-tetradecanoylphorbol-13-acetate (TPA) induces phosphorylation of intracellular PCK substrates. Cells transferred to 3D-NPC and probed with anti-phospho PKC substrate antibody 2261 from Cell Signaling Technology (CST) exhibit differential PKC substrate phosphorylation depending on TPA treatment ("stain cycle" 1 column). Stripping the immunoprobe removes all signal ("after strip" column). Subsequent re-probing with CST anti-beta actin antibody 3700 provides actin protein information for the individual cells probed in the earlier cycle for phospho PKC substrate ("stain cycle 2" column).

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Presently described are methods of transferring, examining, and detecting bio-molecular components of individual cells in a biological sample to a solid porous substrate. It was surprising and unexpectedly discovered that the bio-molecular components of individual cells could be transferred and affixed to discrete locations within the porous substrate of the present disclosure, thereby allowing examination, detection and/or quantification of the individual bio-molecular components of the cells. Furthermore, it was surprising and unexpectedly discovered that the transferred and affixed bio-molecular components of the cells could be probed multiple time after stripping the previous probe(s). Accordingly, the present disclosure provides a method of transferring bio-molecular components of cells in a biological sample to a porous solid substrate, the method including contacting or seeding the biological sample comprising a whole cell (e.g., a eukaryotic cell or a prokaryotic cell), whole cells (e.g., eukaryotic cells or prokaryotic cells), a virus, or viruses to a first side of the porous solid substrate having a plurality of interstices or pores extending contiguously from the first side to a second side, transferring and affixing the bio-molecular components of the biological sample to the interstices or pores of the solid substrate. The present disclosure further provides methods of examining or detecting one or more bio-molecular components of individual cells in a biological sample. The method includes transferring one or more bio-molecular components of individual cells in a biological sample to a solid porous substate, and detecting one or more of the bio-molecular components of the biological sample.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "independently" is used herein to indicate that the variable, which is independently applied, varies independently from application to application.

The term "about" is understood as within a range of normal tolerance in the art, e.g. within 2 standard deviations of the mean. As such, "about" can be understood as within 5%, 4%, 3%, 2%, 1%, 0.5%, 0.1%, 0.05%, or 0.01% of the stated value. Unless otherwise clear from context, all numerical values provided herein are optionally modified by the term about.

The term "binding", as used herein, can mean, but is in no way limited to, the physical or chemical interaction, direct or indirect, between two molecules (e.g., compounds, amino acids, nucleotides, polypeptides, or nucleic acids). Binding includes covalent, hydrogen bond, ionic, non-ionic, van der Waals, hydrophobic interactions, and the like.

The term "cell", as used herein, can mean, but is in no way limited to, its usual biological sense, and does not refer to an entire multicellular organism. The cell can, for example, be from any source, including, e.g., bacteria, plants, insects, amphibians, reptiles, birds, mammals (such as humans, cows, sheep, apes, monkeys, swine, dogs, or cats). As such, unless expressly stated otherwise, the term "cell" includes both a prokaryotic cell(s) (e.g., bacterial cell) or a eukaryotic cell(s) (e.g., mammalian or plant cell).

Method of Transferring a Biological Sample to Porous Solid Substrate

An aspect of the present disclosure provides a method for transferring one or more bio-molecular components of individual cells in a biological sample to a solid porous substate. In any aspect or embodiment described herein, the method of transferring one or more bio-molecular components comprises: (i) contacting or seeding the biological sample (e.g., a biological sample comprising a whole cell (e.g., a eukaryotic cell or a prokaryotic cell)), or a virus to a first side of the porous solid substrate having a plurality of interstices or pores extending contiguously from the first side to a second side; (ii) transferring the bio-molecular components (e.g., one or more components) of the biological sample to the interstices or pores of the solid substrate; and (iii) affixing the bio-molecular components of the biological sample to the interstices or pores of the solid substrate. In any aspect or embodiment described herein, the method of transferring one or more bio-molecular components comprises: (i) contacting or seeding the biological sample (e.g., a biological sample comprising a whole cell, whole cells, a virus, or viruses) to a first side of the porous solid substrate having a plurality of interstices or pores extending contiguously from the first side to a second side; and (ii) transferring and affixing the bio-molecular components of the biological sample to the interstices or pores of the solid substrate.

In any aspect or embodiment described herein, contacting or seeding of the biological sample on the porous solid substrate such that only a single cell or virus is disposed at the opening of each respective interstices or pore of the first side of the substrate. In any aspect or embodiment described herein, transferring the bio-molecular components of the biological sample includes lysing the biological sample (e.g., with the electrophoretic step or applying a lysis buffer to the biological sample, cells and/or virus on the porous solid substrate or prior to contact with the porous solid substrate) so that the cellular components from the cell or the viral components from the virus that are seeded on the porous solid substrate flow immediately into the interstices or pores.

In any aspect or embodiment described herein, one or more, e.g., a plurality or population of bio-molecular components of the individual cells or viruses in a biological sample are transferred and/or examined.

In any aspect or embodiment described herein, the substrate is a derivatized porous alumina (e.g., a nanoporous alumina). In any aspect or embodiment described herein, the substrate is a derivatized porous glass. In any aspect or embodiment described herein, the substrate is a derivatized polymeric material.

In any aspect or embodiment described herein, the interstices or pores have a diameter of about 500 nm or less. Thus, in any aspect or embodiment described herein, the interstices have a diameter of about 500 nm or less than about 500 nm. For example, in any aspect or embodiment described herein, the interstices have a diameter of less than or equal to about 500 nm, less than or equal to about 450 nm, less than or equal to about 400 nm, less than or equal to about 350 nm, less than or equal to about 300 nm, less than or equal to about 250 nm, less than or equal to about 200 nm, less than or equal to about 150 nm, less than or equal to about 100 nm, less than or equal to about 500 nm, about 25 nm to about 500 nm, about 25 nm to about 400 nm, about 25 nm to about 300 nm, about 25 nm to about 200 nm, about 25 nm to about 100 nm, about 100 nm to about 500 nm, about 100 nm to about 400 nm, about 100 nm to about 300 nm, about 100 nm to about 200 nm, about 200 nm to about 500 nm, about 200 nm to about 400 nm, about 200 nm to about 300 nm, about 300 nm to about 500 nm, about 300 nm to about 400 nm, or about 400 nm to about 500 nm.

In any aspect or embodiment described herein, the solid porous substrate has a thickness from the first side to the second side of about 50 µm to about 100 µm. In any aspect or embodiment described herein, the porous substrate has a thickness from the first side to the second side of about 100 µm. In any aspect or embodiment described herein, the porous substrate has a thickness from the first side to the second side of about 50 to about 100 µm. For example, in any aspect or embodiment described herein, the thickness from the first side to the second side is about 50 to about 100 µm, about 50 to about 90 µm, about 50 to about 80 µm, about 50 to about 70 µm, about 50 to about 60 µm, about 60 to about 100 µm, about 60 to about 90 µm, about 60 to about 80 µm, about 60 to about 70 µm, about 70 to about 100 µm, about 70 to about 90 µm, about 70 to about 80 µm, about 80 to about 100 µm, about 80 to about 90 µm, or about 90 to about 100 µm.

In any aspect or embodiment described herein, the porous solid substrate or the plurality of interstices or pores has a cellular component-reactive coating that is reactive to or has the intrinsic ability to covalently bind and/or couple the bio-molecular components of biological sample. For example, in any aspect or embodiment described herein, the porous solid substrate or the plurality of interstices or pores has a cellular component-reactive coating that is reactive to or has intrinsic ability to covalently bind and/or couple at least one of protein(s), nucleic acid(s), lipid(s), metabolite(s), carbohydrate(s), and combinations thereof. Thus, in any aspect or embodiment described herein, the solid porous substrate comprises: a first side and a second side and a plurality of interstices extending contiguously from the first side to the second side, wherein the interstices are coated with a cellular component-reactive coating; and the porous substrate comprises nanoporous alumina or porous glass.

In any aspect or embodiment described herein, the cellular component-reactive coating is a protein-reactive coating (e.g., a coating that has the intrinsic ability to covalently bind/couple protein). In any aspect or embodiment described herein, the cellular component-reactive coating is a nucleic acid-reactive coating (e.g., a coating that has the intrinsic ability to covalently bind/couple nucleic acids), In any aspect or embodiment described herein, the cellular component-reactive coating is a lipid-reactive coating (e.g., a coating that has the intrinsic ability to covalently bind/couple lipids). In any aspect or embodiment described herein, the cellular component-reactive coating is a metabolite-reactive coating (e.g., a coating that has the intrinsic ability to covalently bind/couple metabolites). In any aspect or embodiment described herein, the cellular component-reactive coating is a carbohydrate-reactive coating (e.g., a coating that has the intrinsic ability to covalently bind/couple carbohydrates).

In any aspect or embodiment described herein, the cellular component-reactive coating is a protein-reactive coating comprises a silane derivative. In any aspect or embodiment described herein, the silane derivative is covalently bound to the nanoporous alumina substrate. In any aspect or embodiment described herein, the protein-reactive coating is selected from the group consisting of:

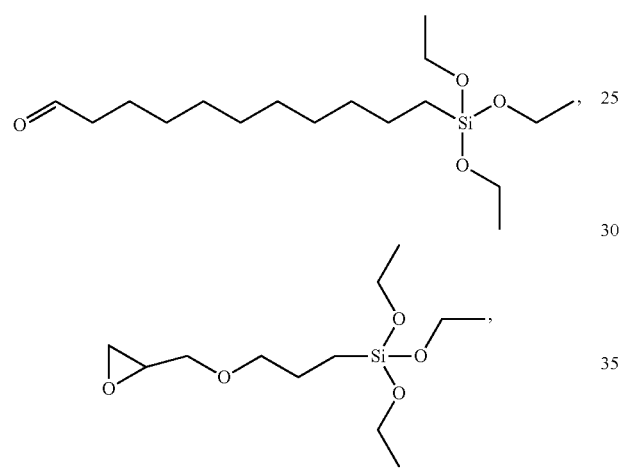

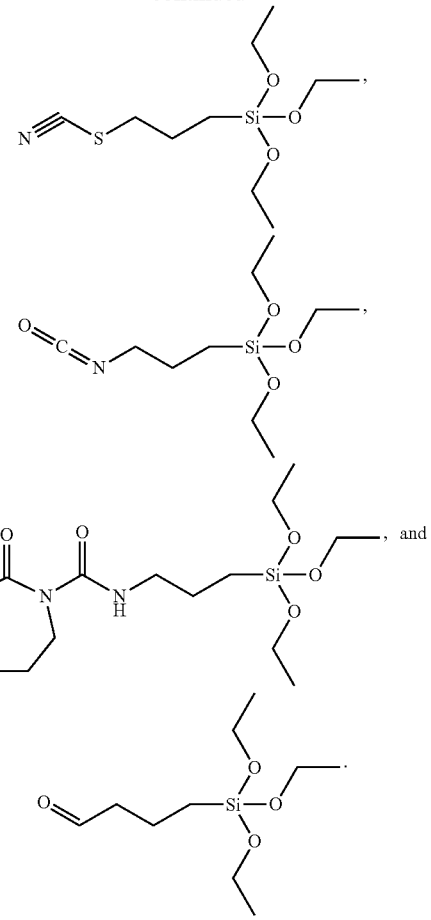

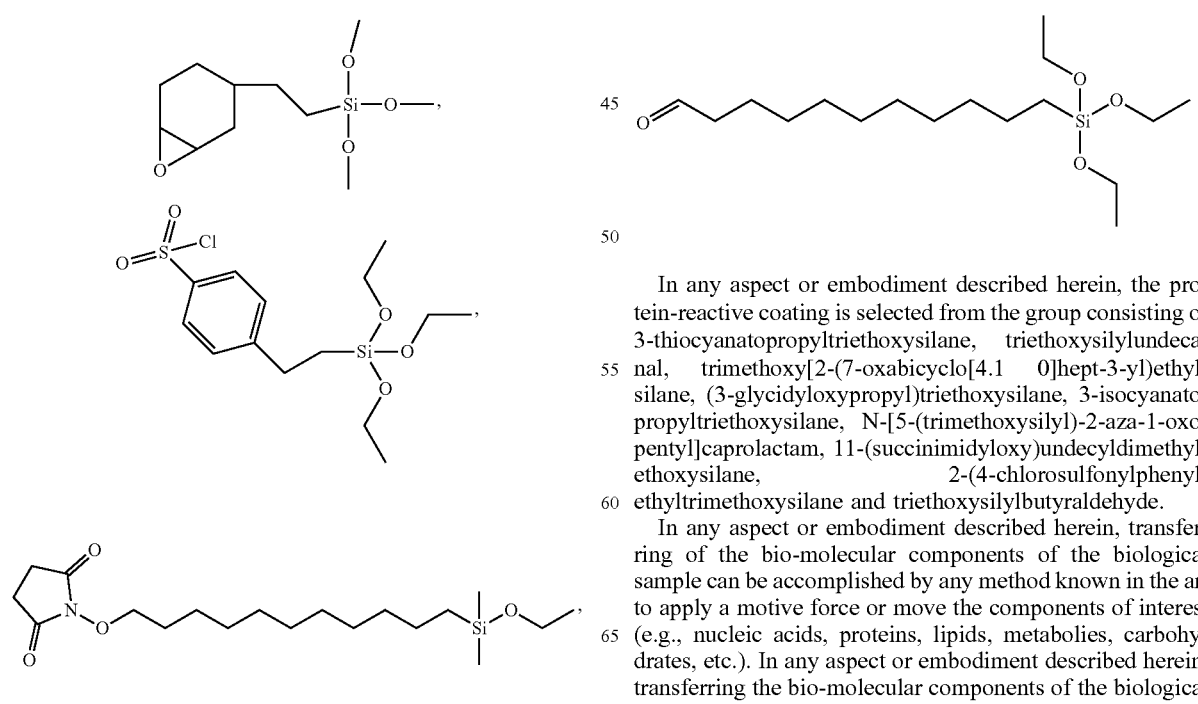

In any aspect or embodiment described herein, the protein-reactive coating is triethoxysilylundecanal In any aspect or embodiment described herein, the protein-reactive coating is selected from the group consisting of 3-thiocyanatopropyltriethoxysilane, triethoxysilylundecanal, trimethoxy[2-(7-oxabicyclo[4.1.0]hept-3-yl)ethyl] silane, (3-glycidyloxypropyl)triethoxysilane, 3-isocyanatopropyltriethoxysilane, N-[5-(trimethoxysilyl)-2-aza-1-oxopentyl]caprolactam, 11-(succinimidyloxy)undecyldimethylethoxysilane, 2-(4-chlorosulfonylphenyl)ethyltrimethoxysilane and triethoxysilylbutyraldehyde.

In any aspect or embodiment described herein, transferring of the bio-molecular components of the biological sample can be accomplished by any method known in the art to apply a motive force or move the components of interest (e.g., nucleic acids, proteins, lipids, metabolites, carbohydrates, etc.). In any aspect or embodiment described herein, transferring the bio-molecular components of the biological sample is accomplished through electrophoresis. In any aspect or embodiment described herein, the biological sample, the whole cell, and/or the virus are lysed via electrophoresis. In any aspect or embodiment described herein, transferring the bio-molecular components of the biological sample is accomplished through convection. In any aspect or embodiment described herein, transferring the bio-molecular components of the biological sample is accomplished through gravity. In any aspect or embodiment described herein, transferring the bio-molecular components of the biological sample is accomplished through centrifugation.

In any aspect or embodiment described herein, the bio-molecular components of the biological sample include, consists essentially of, or consists of at least one of nucleic acids, proteins, lipids, metabolites, carbohydrates, and combinations thereof. In any aspect or embodiment described herein, the bio-molecular components of the biological sample include, consists essentially of, or consists of nucleic acids. In any aspect or embodiment described herein, the bio-molecular components of the biological sample include proteins. In any aspect or embodiment described herein, the bio-molecular components of the biological sample include, consists essentially of, or consists of lipids. In any aspect or embodiment described herein, the bio-molecular components of the biological sample include, consists essentially of, or consists of metabolites. In any aspect or embodiment described herein, the bio-molecular components of the biological sample include, consists essentially of, or consists of carbohydrates.

In any aspect or embodiment described herein, the cells of the biological sample are individually located (e.g., there is pace between the individual cells of the biological sample) on the porous solid substrate. In any aspect or embodiment described herein, the biological sample is not a cell or cells. In any aspect or embodiment described herein, the biological sample is not an intact cell or cells. In any aspect or embodiment described herein, the biological sample comprises, consists essentially of, or consists of a cell, e.g., a eukaryotic or a prokaryotic cell, or a virus. For example, in any aspect or embodiment described herein, the biological sample comprises, consists essentially of, or consists of a virus or viral particle. By way of further example, in any aspect or embodiment described herein, the biological sample is a tissue section.

In any aspect or embodiment described herein, the cells have not been fixed (e.g. the cells or biological sample is in a native condition/state). In any aspect or embodiment described herein, the biological sample has not been fixed (e.g. the cells or biological sample is in a native condition/state). In additional embodiments, the proteins probed on the substrate are representative of a single cell or virus at each discrete interstices or pore location and are not representative of a lysate of a population of cells or viruses.

Alternatively, in any aspect or embodiment described herein, the cells have been fixed any method known in the art to induce fixation (such as immersion in methanol solution). In any aspect or embodiment described herein, the biological sample has been fixed any method known in the art to induce fixation (such as immersion in methanol solution). For example, in any aspect or embodiment described herein, the cells have been fixed (e.g., the cells or biological samples are fixed by any method known in the art to induce fixation, such as immersion in methanol solution). Additionally, in any aspect or embodiment described herein, the biological sample has been fixed (e.g., the cells or biological samples are fixed by any method known in the art to induce fixation, such as immersion in methanol solution).

In any aspect or embodiment described herein, the method further comprises lysing the biological sample, the whole cell, and/or the virus on or prior to contact with the solid porous substrate prior to transferring the bio-molecular components of the biological sample. In any aspect or embodiment described herein, lysing includes applying a lysis buffer to the biological sample, the whole cells, and/or the virus, or contacting the biological sample, the whole cells and/or the virus with a lysis buffer. For example, in any aspect or embodiment described herein, the lysis buffer comprises, consist essentially of, or consist of 50 mM MOPS (3-(N-morpholino)propanesulfonic acid), 50 mM BisTris, 25 mM TCEP (tris(2-carboxyethyl)phosphine), 1% SDS, pH 7.3.

Method of Examining a Biological Sample

Another aspect of the present disclosure provides a method for examining or detecting one or more bio-molecular components of individual cells or virus in a biological sample. In any aspect or embodiment described herein, the method of examining or detecting one or more bio-molecular components comprises: transferring bio-molecular components (one or more bio-molecular components) of individual cells in a biological sample to a solid porous substrate according to any aspect or embodiment described herein; and detecting one or more of the bio-molecular components of the biological sample. In any aspect or embodiment described herein, the method of examining or detecting one or more bio-molecular components comprises: (i) contacting or seeding the biological sample (e.g., a biological sample comprising a whole cell (e.g., a eukaryotic cell or a prokaryotic cell), whole cells (e.g., eukaryotic cells or prokaryotic cells), a virus, or viruses) to a first side of the porous solid substrate having a plurality of interstices or pores extending contiguously from the first side to a second side; (ii) transferring bio-molecular components (e.g., one or more bio-molecular components) of the biological sample to the interstices or pores of the solid substrate; and (iii) affixing the bio-molecular components of the biological sample to the interstices or pores of the solid substrate; and (iv) detecting one or more of the bio- molecular components of the biological sample. In any aspect or embodiment described herein, the method of examining or detecting one or more bio-molecular components comprises: (i) contacting or seeding the biological sample (e.g., a biological sample comprising a whole cell, whole cells, a virus, or viruses) to a first side of the porous solid substrate having a plurality of interstices or pores extending contiguously from the first side to a second side; (ii) transferring and affixing bio-molecular components (e.g., one or more bio-molecular components) of the biological sample to the interstices or pores of the solid substrate; and (iii) detecting one or more of the bio-molecular components of the biological sample.

In any aspect or embodiment described herein, detecting includes detecting binding of one or more probes to the individual bio-molecular components of the biological sample by any appropriate method known in the art, such as fluorescent microscopy or quantitative fluorescent microscopy. Furthermore, in any aspect or embodiment described herein, one or more probes are utilized to examine and/or detect at least one (e.g., 1, 2, 3, 4, 5, 6, 7, 8, 9, or more) control bio-molecular component. Additionally, in any aspect or embodiment described herein, the one or more control bio-molecular components are utilized to normalize the bio-molecular components of interest examined (e.g., normalized for quantification of one or more bio-molecular components of interest).

In any aspect or embodiment described herein, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, or more bio-molecular components of the individual cells in a biological sample are examined and/or detected.

In any aspect or embodiment described herein, detecting includes contacting the bio-molecular components of the biological sample with one or more probes specific for individual bio-molecular components interest of the cells.

In any aspect or embodiment described herein, the one or more probes are applied simultaneously (e.g., each utilizing a unique detection marker, as described herein, to allow for simultaneous examination/detection). In any aspect or embodiment described herein, the one or more probes are applied serially (each utilizing a unique detection marker or reusing the same detection markers, as described herein). In any aspect or embodiment described herein, detecting further includes detecting binding of the one or more probes with the individual bio-molecular components of the biological sample.

In any aspect or embodiment described herein, detecting includes: (a) contacting the bio-molecular components of the biological sample with one or more probes specific for individual bio-molecular components of the biological sample; (b) detecting binding of the one or more probes to the individual bio-molecular components of the biological sample; (c) stripping the one or more probes; and (d) repeating (a) through (b) or (c) one or more times to detect additional bio-molecular components of the biological samples that are of interest. For example, in any aspect or embodiment described herein, steps (a) through (b) or (c) can be repeated 1 to 100 or more times (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more times) to detect additional bio-molecular components of interest in the biological samples.

In any aspect or embodiment described herein, at least one probe includes or is conjugated to a detection marker (e.g., at least one probe includes or is conjugated to a fluorescent dye). Alternatively, in any aspect or embodiment described herein, a probe specific binding moiety (e.g., an antibody, aptomer, etc.) is utilized that binds to a specific probe and that is conjugate to or includes a detection marker (e.g., a fluorescent dye). Thus, in any aspect or embodiment described herein, detecting further includes, after contacting the bio-molecular components of the biological sample with one or more probes specific for individual bio-molecular components of interest of the biological sample, contacting the solid porous substrate or the bound probes with a probe specific binging moiety (e.g., an antibody, aptomer, etc.) that binds to a specific probe and that is conjugated to or includes a detection marker (e.g., a fluorescent dye).

In any aspect or embodiment described herein, at least one probe is an antibody. In any aspect or embodiment described herein, at least one probe is an aptamer. In any aspect or embodiment described herein, at least one probe is a protein. In any aspect or embodiment described herein, at least one probe is a nucleic acid. In any aspect or embodiment described herein, at least one probe is an enzyme or a portion thereof.

In any aspect or embodiment described herein, detecting further includes determining the signal intensity provided by binding of the probe to the individual component of interest of the biological sample to quantify the amount of the component of interest of the biological sample. In any aspect or embodiment described herein, determining the signal intensity is performed for two or more (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more) of the individual bio-molecular components of interest of the biological sample.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A method for transferring bio-molecular components of individual cells in a biological sample to a porous substate, the method comprising:

contacting or seeding the biological sample comprising a whole cell or a virus to a first side of the porous substrate having a plurality of interstices or pores extending contiguously from the first side to a second side, wherein the porous substrate underlies the whole cell or virus and is derivatized such that each of the interstices or pores covalently bind and/or couple the bio-molecular components of the whole cell or virus in the biological sample; and transferring the bio-molecular components of the whole cell or virus in the biological sample to the interstices or pores of the porous substrate, wherein the bio-molecular components of the whole cell or virus covalently affix to the interstices or pores of the porous substrate, wherein:
the porous substrate is a derivatized porous alumina, a derivatized porous glass, or a derivatized porous polymeric material;
the interstices or pores have a diameter of 500 nm or less; and
the porous substrate has a thickness from the first side to the second side of 50 µm to 100 µm.

2. The method of claim 1, wherein transferring the bio-molecular components of the biological sample is accomplished through electrophoresis.

3. The method of claim 2, wherein the biological sample, the whole cell, and/or the virus are lysed via the electrophoresis.

4. The method of claim 1, wherein transferring the bio-molecular components of the biological sample is accomplished through convection, gravity, or centrifugation.

5. The method of claim 1, wherein the interstices or pores have a diameter of 450 nm or less.

6. The method of claim 1, where the bio-molecular components of the biological sample include nucleic acids, proteins, lipids, carbohydrates, or a combination thereof.

7. The method of claim 1, further comprising, prior to transferring the bio-molecular components of the biological sample, lysing the biological sample, the whole cell, and/or the virus on the porous substrate or prior to contact with the porous substrate.

8. The method of claim 7, wherein lysing includes applying a lysis buffer to the biological sample, the whole cell and/or the virus, or contacting the biological sample, the whole cell and/or the virus with a lysis buffer.

9. A method for detecting one or more bio-molecular components of individual cells in a biological sample, the method comprising: transferring the one or more bio-molecular components of each individual cell in a biological sample to an interstice or pore within the porous substrate according to the method of claim 1; and detecting the one or more bio-molecular components of each individual cell in the biological sample.

10. The method of claim 9, wherein detecting includes contacting the bio-molecular components of the biological sample with one or more probes specific for individual bio-molecular components of the individual cells.

11. The method of claim 10, wherein the one or more probes are applied simultaneously.

12. The method of claim 10, wherein the one or more probes are applied serially.

13. The method of claim 10, wherein detecting further includes detecting binding of the one or more probes with the individual bio-molecular components of the biological sample.

14. The method of claim 9, wherein detecting includes:
(a) contacting the bio-molecular components of the biological sample with one or more probes specific for individual bio-molecular components of the biological sample;
(b) detecting binding of the one or more probes to the individual bio-molecular components of the biological sample;
(c) stripping the one or more probes; and
repeating (a) through (b) or (a) through (c) one or more times to detect additional bio-molecular components of the biological samples.

15. The method of claim 10, wherein at least one probe includes or is conjugated to a detection marker.

16. The method of claim 10, wherein detecting further includes, after contacting the bio-molecular components of the biological sample with one or more probes specific for individual bio-molecular components of the biological sample, contacting the porous substrate or the bound probes with a probe specific binging moiety that binds to a specific probe and that is conjugated to or includes a detection marker.

17. The method of claim 10, wherein at least one probe is an antibody, an aptamer, a protein, a nucleic acid, an enzyme, a portion of an enzyme, or a combination thereof.

18. The method of claim 9, wherein detecting further includes determining signal intensity provided by binding of the probe to the individual component of the biological sample to quantify the amount of the component of the biological sample.

19. The method of claim 18, wherein determining the signal intensity is performed for two or more of the individual bio-molecular components of the biological sample.

20. The method of claim 1, wherein the whole cell or biological sample have not been fixed.

21. The method of claim 1, wherein the whole cell or biological sample have been fixed.

* * * * *